United States Patent [19]
Myers, Jr.

[11] 3,742,999
[45] July 3, 1973

[54] TIRE MOUNTING AND DEMOUNTING MACHINE

[75] Inventor: Hugh I. Myers, Jr., St. Joseph, Mo.

[73] Assignee: FMC Corporation, San Jose, Calif.

[22] Filed: July 14, 1971

[21] Appl. No.: 162,386

[52] U.S. Cl.............. 157/1.28, 157/1.17, 157/1.24
[51] Int. Cl............................................. B60c 25/06
[58] Field of Search................... 157/1.17, 1.2, 1.22, 157/1.24, 1.26, 1.28

[56] References Cited
UNITED STATES PATENTS

| | | | |
|---|---|---|---|
| 3,212,552 | 10/1965 | Foster................................ | 157/1.17 |
| 3,246,681 | 4/1966 | May.................................... | 157/1.28 |
| 3,255,800 | 6/1966 | Strong et al. ...................... | 157/1.24 |
| 3,255,801 | 6/1966 | Tabordon .......................... | 157/1.28 |
| 3,511,296 | 5/1970 | Houston et al. ................... | 157/1.24 |

Primary Examiner—Granville Y. Custer, Jr.
Attorney—F. W. Anderson

[57] ABSTRACT

A power operated tire mounting and demounting machine provided with a wheel supporting frame unit; a pair of bead breaking shoes; means mounting the shoes on the frame unit for movement into engagement with diametrically opposed beads along paths where the shoes initially move primarily radially of the wheel and thence axially thereof to assure positive displacement of the beads toward the central area of the wheel without damage to the wheel regardless of the diameter thereof within working limits; a rotatable element extending through the wheel for coupling of a tire mount-demount tool thereto; a single power source operably joined to the element and the bead breaking means for moving the shoes through the bead breaking paths thereof; and selectively operable means for permitting movement of only the tool operating element, or the bead breakers by said power source as selected. One of the bead breakers is removably mounted on the frame unit for facilitating placement on and removal of the wheel or mounted tire and wheel from the frame unit. The shoe of the other bead breaker is pivotally carried by the support therefor so it can be swung away from a tire on the frame unit to an ineffective position clearing the tire. Both bead breakers are provided with guide means and mounting structure which operate to limit radial movement of the shoe toward the bead seats of the wheel to an extent to prevent engagement of the shoes with corresponding tire bead seats.

47 Claims, 10 Drawing Figures

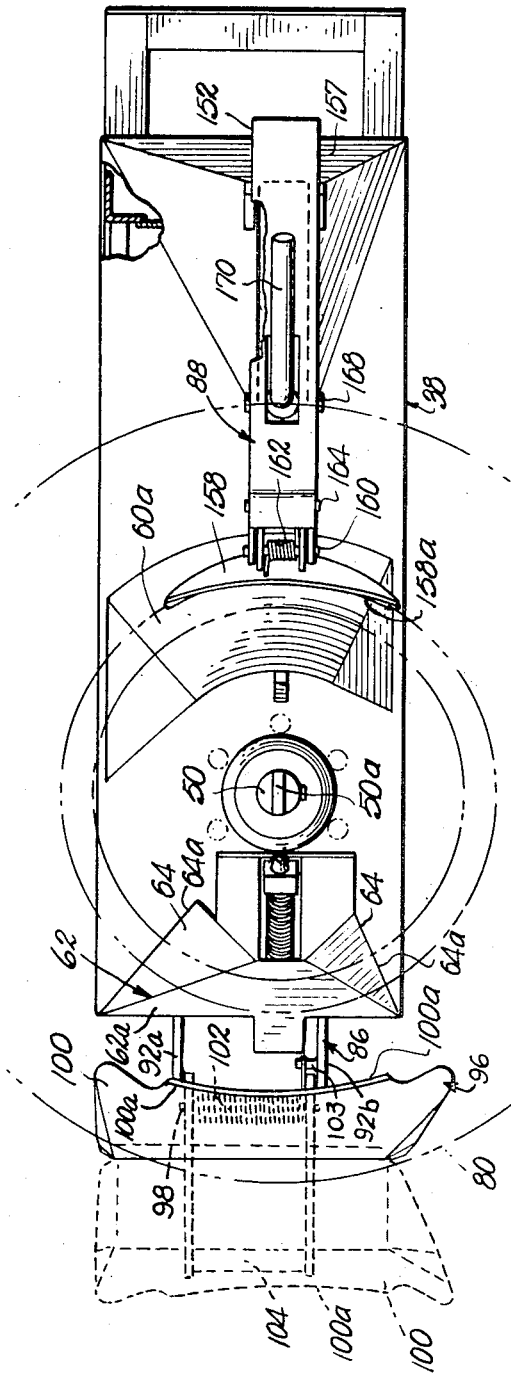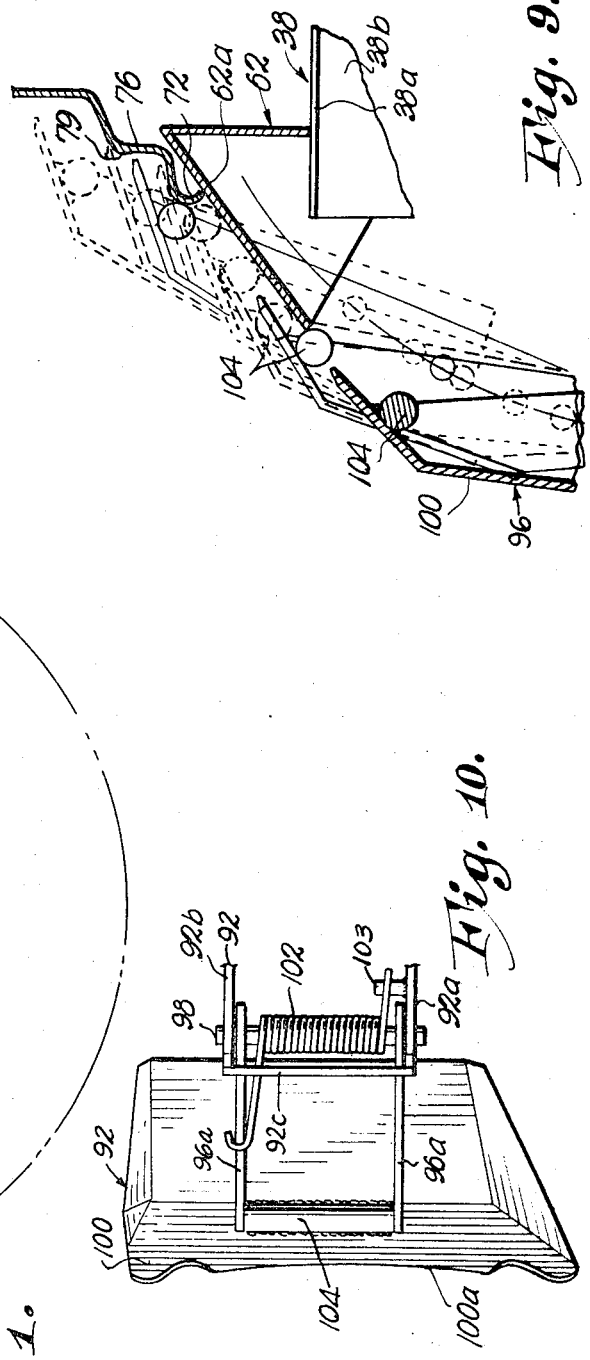

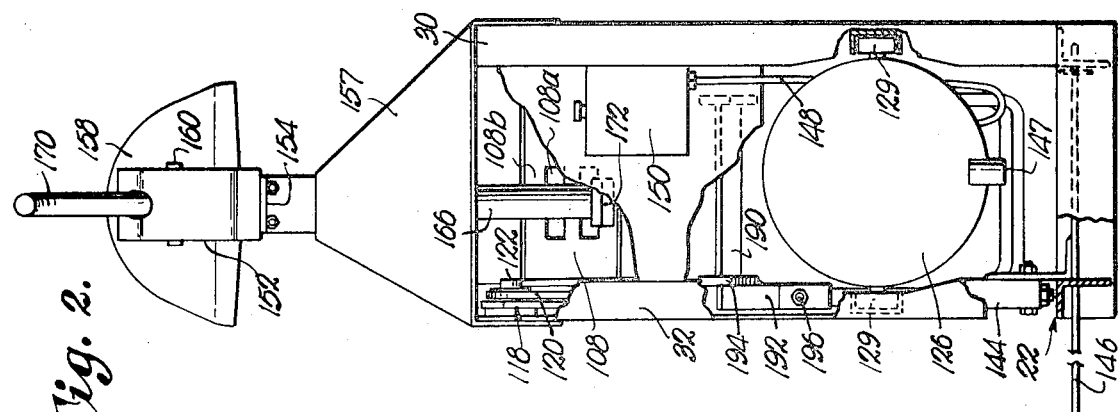
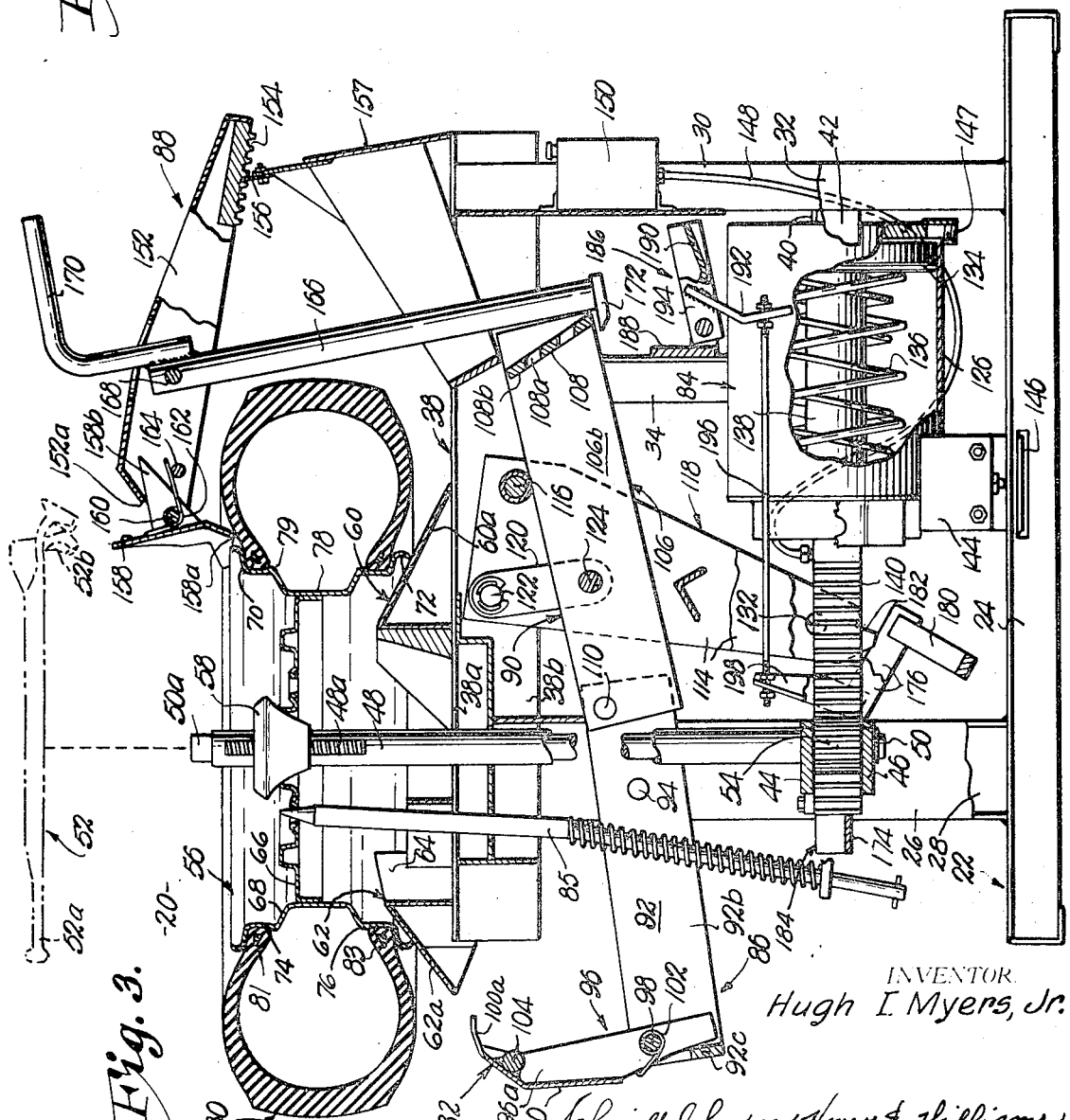

INVENTOR.
Hugh I. Myers, Jr.

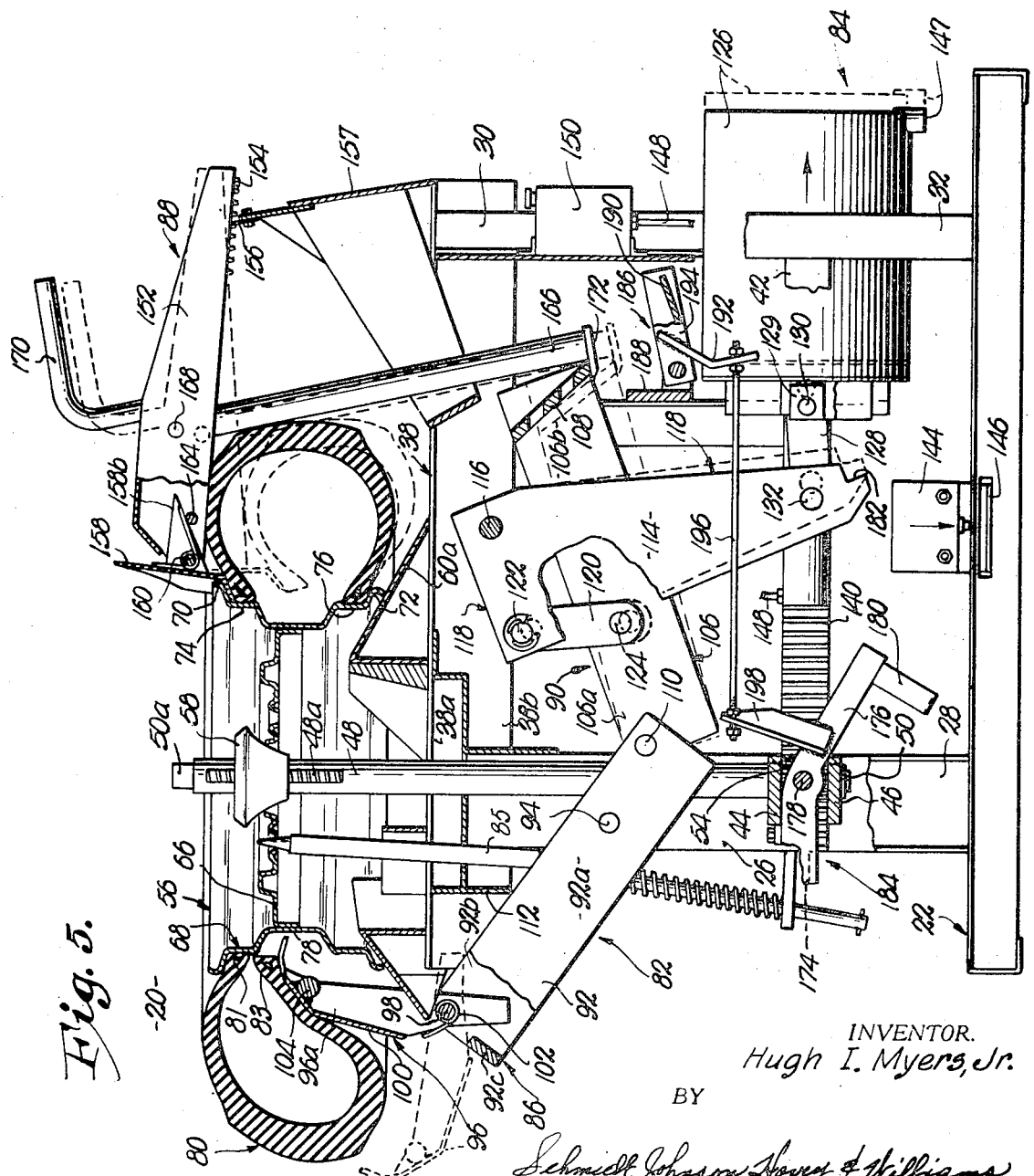

PATENTED JUL 3 1973 3,742,999

INVENTOR.
Hugh I. Myers, Jr.
BY
Schmidt, Johnson, Hovey & Williams
ATTORNEYS.

TIRE MOUNTING AND DEMOUNTING MACHINE

BACKGROUND OF THE INVENTION

This invention relates to a tire changing machine and particularly to an economical, improved power operated changer suitable for mounting and demounting tires, including those of the tubeless type, on wheels used on passenger cars and light trucks. Wheels of this type generally have opposed outer rim flanges adjacent respective tire bead seats which lead to an interior annular area which is usually of the drop center type. Many rims today are also provided with a raised annular safety hump between at least one of the bead seats and the drop center. The machine of this invention has greatest utility to assist personnel in the mounting and demounting of tires in repair shops and service stations where it is necessary to remove a tire for repair or replacement and to install the repaired tire or a new one.

Current, common practice in demounting a tire is as follows:

The tire and wheel are placed on the tire changer over a center post and are clamped to the support table in essentially a horizontal position. The normal outer face of the tire is facing upwardly so that the valve core may be removed to permit internal air pressure in the tire to drop essentially to atmospheric level. The tire beads must then be broken loose from respective bead seats adjacent the rim flanges of the wheel. For many years this was laboriously accomplished using hand tools such as chisel-like tools and hammers. Some years ago power operated tools were developed which served to provide some assistance to the serviceman by breaking loose one bead of the tire at a time. The most recent power machines in this field have bead breakers operable to displace both beads simultaneously although certain models function to break the opposed beads loose from the bead seats in successive order.

In one type of machine currently in use, a bead breaking mechanism is provided for displacing the beads toward each other using opposed bead breakers located in the same circumferential location around the perimeter of the tire. Usually these bead breakers react on one another, i.e. a force cannot be created against one bead unless a proportional force is present at the other bead. This "same side" type of bead breaking technique has a serious disadvantage in that each bead, particularly that bead associated with the wide side of most drop center rims, must be displaced a considerable distance axially of the wheel inwardly away from the rim flange to effect a loosening action of the bead around the circumference of the rim using a shoe covering only a small portion of the circumferentially extending bead area. Since both shoes must displace the respective bead of the tire to a greater or lesser degree, quite often there is not sufficient space between the rim flanges in a given circumferential location for the bead breaking shoes to be movable toward each other through an increment of travel adequate to assure displacement of both beads from the bead seats. Consequently, successive operations of the bead breakers are necessary to displace both beads from the wheel bead seats. Usually this is performed by either locking out the bead breaker associated with the bead which has been shifted into the drop center of the wheel, or the tire is rotated to a second position on the machine and the bead breaking operation is repeated.

In another type of tire changing machine in commerical usage, the bead breakers for displacing opposed tire beads into the drop center of the wheel are disposed at diametrically opposite locations on opposed sides of the tire. This design approach allows significant displacement space for each bead breaker to operate. However, these machines have inherent disadvantages attributable to the fact that both bead breakers are mechanically tied together so that with both bead breakers in place against respective beads of the tire, both bead breakers move positively with respect to the tire and wheel upon actuation of the power source. By virtue of the fact that a certain amount of force is required to break each bead, a force roughly twice that required to effect loosening of one bead is present at a single breaker shoe as soon as the other shoe has loosened the associated bead because of the mechanical constraint between the two bead breaking assemblies. Doubling of the force on one bead as soon as the opposed bead breaks loose occurs because there is little or no resistance offered to the breaker shoe against the bead which has broken loose and thus all force available from the power source transfers to the breaker shoe still resisted by the tire bead. The effect of such force may cause a wheel rim to be bent or otherwise damage the wheel.

After the two tire beads are loosened from the bead seats, the procedure for removing the tire from the wheel is essentially the same in both of the current types of machines in commercial practice. In broad terms, a mount-demount tool is attached to the upper part of the center post of the tire changer and the center post is rotated by a mechanism forming a part of the tire changing machine. The tire tool, having a hook portion at the outer extremity thereof, is placed under one bead, lifted over the rim flange and then rotated by the center post to lift the remaining part of the bead over the rim. This process is then repeated for the lower bead.

Mounting of a tire on the wheel is accomplished in a similar manner using the mounting tool which is also rotated by the center post causing such tool to travel circumferentially around the rim flange while extending the bead outwardly to an extent where it can drop over the flange and then be pushed into the drop center of the wheel.

Center post rotation for operating the mount-demount tool is normally accomplished either by:

1. Two separate power sources for the center post and bead breaker mechanisms respectively using different operator controls therefor; or
2. A single power source for actuating the bead breakers as well as the center post.

Two power sources for the operating mechanism of the machine obviously increases the expense of manufacturing the equipment as well as the maintenance of the unit in service. In addition, the operator must select the function which he requires, i.e. bead breaking or rotation; thus making relatively complicated control mechanism a requisite in order to assure foolproof operation of the apparatus.

Machines embodying a single power source for operating the tool center post as well as the bead breakers have a common mechanism which constrains the center post and a bead breaker in such a manner that both move upon power source actuation. Moving the center post during bead breaking causes no harm, but moving a bead breaker during removal of a tire and particularly during installation thereof, can cause an interference between the bead breaker and the bead that is being forced over the rim flange of the wheel into the bead seat area or drop center area.

In addition, when an attempt is made to mount a tire on those machines which constrain the lower bead breaker shoe to move with the center post, it is frequently found that the lower shoe is forced against the upper edge of the rim drop center before sufficient center post rotation is developed to drive the mounting tool around the rim flange to effect complete mounting. The operator generally is not aware of the condition that has caused the center post to cease moving and continues to operate the mechanism. As a consequence, the excess force developed in this manner in one shoe can cause a rim to be bent. Also, a second attempt at mounting the tire must be carried out.

Although power operated tire changing machines have enjoyed wide commercial success by virtue of the elimination of laborious effort required prior to the availability of such machines to remove and mount tires on metallic wheels commonly used for vehicles of all types, practical problems have been encountered in the design and use of such machines in addition to those detailed above and particularly insofar as construction and operation of the bead breakers are concerned. To remove the tire from the wheel, it is necessary to push both tire beads off of the rim bead seat areas toward the inner drop center area of the wheel. Current commercial practice is to employ two bead breaking shoes which are forced against the outside of the tire bead areas on opposite sides of the tire thereby pushing the beads off of the rim bead seat areas. If each shoe is merely pushed only in an axial direction of the tire and it is free to move radially outwardly, it has been found that the shoe has a tendency to slide radially outwardly from the bead and then pushes only on the side-walls of the tire. Since the side-walls of the tire are relatively soft, a force on such side-wall only tends to roll the bead on the bead seat area and upon retraction of the axial shoe force, the bead assumes essentially the original undisplaced position on its rim bead seat.

In order to obtain optimum operation of the bead breaking mechanism, it is desirable that two additional functions be provided in addition to applying an axial force to the bead displacement shoe. First, the shoe lip should be positionable as close as possible to the rim bead seat so that the axial force is applied in the closest relationship to the bead seat as is feasible in order to minimize the roll-over tendency explained above. Desirably, the bead breaker shoe is capable of first sliding under the rim flange of the wheel without significantly displacing the tire bead axially thereby placing the bead breaker shoe lip in close proximal relationship to the bead seat wall itself. Secondly, a constraint for the bead breaking shoe should be provided to prevent the shoe from moving radially away from the wheel rim so that the tendency for the bead to roll over as an axial force is applied thereto, is minimized.

However, shoe driving requisites are further complicated by the fact that most metallic wheels today, particularly those adapted for receiving tubeless tires, have safety humps comprising raised annular areas extending around the circumference of the wheel between the bead seat area and the drop center. Although certain types of wheels have only one safety hump, more and more wheels are now being provided with safety humps on both sides of the wheel. The safety humps, which comprise ridges in the bead seat area protruding radially outwardly around the tire rim serve as safety factors in that they resist unseating of the bead during use of the tire. As a consequence, if a bead breaker shoe lip is allowed to rub or guide on the bead seat of the wheel, the shoe lip could hang up on the safety hump.

Thus, it is obvious that the lip of the bead breaker shoe must travel in a closely controlled path relative to the bead seat area after the shoe has made an initial penetration under the rim flange. This path must be close to the bead seat, such that the roll over tendency is reduced, yet spaced from the bead seat so that interference with the safety hump is avoided.

Further complications arise from the need for providing a controlled shoe lip path of travel notwithstanding the fact that the machine must accommodate tire wheels of various rim diameters. Most of the tire changing machines now available employ a wheel clamping assembly which secures the rim to the machine in disposition such that the axial center of the wheel is in the same location on the machine regardless of the rim diameter. This causes the bead seat area, and thus the path which the breaker shoe lip should desirably follow, to be located at different positions on the machine for different tire wheel deameters.

Efforts heretofore made to solve the problems inherent in compensating for wheels of different diameters have also taken several different mechanical forms. In one type heretofore used, the operator must first determine the size of the rim to be worked on and then is required to adjust or modify the machine to adapt the bead breaking mechanism so that it will follow the appropriate bead breaker shoe lip path. In actual practice, operators often neglect to determine the correct rim size and do not make the necessary adjustments to the machine so that bead breaking is either ineffective or damage occurs to the rim or the tire itself. The need for rim size determination and resulting machine adjustment is also time consuming, leading to work inefficiency.

In a second type of machine design wherein effort is made to provide compensation for different wheel diameters, a bead breaker is provided which makes it mandatory for the operator to place a part of the bead breaker mechanism on the wheel rim itself, either radially inwardly of the bead seat area or on the rim flange. With a part of the machine attached to or guided by the rim of the wheel itself, a reasonable shoe lip path can be realized for various rim diameters without a conscious rim size determination and machine adjustment by the operator. However, as pointed out previously, an outward radial restraining force is required to first, resist the force developed while the shoe lip is penetrating the rim flange-bead seat interface and second, to resist the tendency of the shoe to slide radially outwardly and thus allow the bead to roll over. This radial outwardly directed force is resisted by that part of the mechanism which contacts the rim of the wheel. This contact force can either mar a chrome or painted rim surface or can bend a rim flange. In addition, this type of lip positioning of the breaker shoe requires that there be some degree of rim material thickness similarity from rim to rim. This mechanical arrangement therefore will not function properly if the rim is constructed of a relatively thick material such as is found on currently popular wheels made of light weight materials such as aluminum or magnesium alloys.

SUMMARY OF THE INVENTION

Past experience with power operated tire changers capable of effectively assisting an operator in the mounting and demounting of tires on vehicle wheels of varying diameters and rim thicknesses, has shown that the machine desirably should have the following operational characteristics. First, the tire in its clamped position should be disposed horizontally for ease of centering for clamping and bead seating during inflation. Secondly, two bead breakers should be provided, one on top and one on the bottom of the tire for rapid loosening of the beads during a single actuation of the operating mechanism of the apparatus. Thirdly, the bead breakers should be offset and opposed so that they do not get in the way of each other during axial displacement of the beads toward the central area or drop center of the wheel. Fourth, the bead breaker shoe located in disposition to contact the lower bead of the tire clamped on the support table of the machine should be guided in a manner to assure that it properly attacks all rim sizes placed on the machine without operator attention. Fifth, the upper bead breaker which is in view of the operator also must properly attack the rim of the wheel regardless of the size of the tire and wheel assembly being handled at any particular time. Sixth, the upper bead breaker should be removable from the vicinity of the wheel and tire so that the tire can be demounted from the top. Seventh, the mechanism should not apply excessive axial force to a bead if the other bead has already been broken since damage to the rim or tire can occur. Eighth, the bead breaking mechanism should not mar or damage the wheel rim and particularly the portions thereof which are visible after mounting of a tire on the wheel. Ninth, the bead breaking devices should not be of such nature that their size or location interferes with the tire mountdemount operation. The mechanism should be of such nature that it can be fabricated and maintained in use at a practical cost and desirably employing only a single power source for ease of construction, operation and maintenance.

It is therefore an important object of the present invention to provide a tire changing machine fulfilling all of the design criteria listed above and particularly advantageous in this respect in that only a single power source is required to selectively drive either the bead breaking shoes or the tool mount-demount center post driver, and at the same time permitting the provision of unique bead breaker structure wherein the lower bead breaker is pivotally supported on the frame of the machine in disposition such that the lower shoe is always in relatively predetermined spatial relationship with respect to wheels clamped on the frame unit while the upper bead breaker is selectively movable from a stowed tire clearing disposition to an operative location for breaking loose the upper bead of the tire in association with the lower bead breaking thereof.

Insofar as the bead breaking function of the tire changer is concerned, it is an important object of the invention to provide bead breakers which are operable to first move generally radially of the tire between respective rim flanges and the beads of the tire to insure engagement of the tire engaging lips of the bead breaker shoes with the bead portion of the tire to minimize roll over during shifting of the bead breakers, and which are then movable generally axially of the wheel to displace both tire beads from the wheel bead seats without engagement of the bead breaking shoes with the bead seat area of the wheel which could cause damage thereto or jamming of the operating apparatus.

A further important object of the invention is to provide a tire changer as described wherein the components of the machines are operable to provide compensation for breaking loose tire beads on wheels of various diameters without the necessity of the operator making a conscious notation of the size of the wheel or being required to actuate special control devices to establish a predetermined operating mode of the machine for a particular wheel diameter.

Another important object of the invention is to provide a tire changing machine of preferred functional capability wherein a single power source is connected to diametrically opposed upper and lower bead breakers in a manner permitting a single actuation of the power source force to operate both bead breaking shoes and wherein the force delivered from the power source to the bead breakers is split proportionately between each shoe so that each shoe force is dependent upon the presence of the shoe force reaction whereby the bead breaker which has the least resistance will move first and then the other bead breaker will commence shifting movement, subject however to the important restriction that in no case can a force in excess of that required to break a respective bead be made available to each bead breaker which might cause rim or other wheel or machine damage.

A still further important aim of the invention is to provide a tire changing machine wherein the bead breaking shoes are controlled so as to initially move generally radially of the wheel between the rim flange and tire bead and then axially of the wheel in directions to displace the beads from the bead seats therefor, with novel guide and control structure being provided in association with the bead breakers to prevent engagement of the bead displacing lip portions thereof with the wheel even in the instance where the wheel is provided with a radially disposed, circumferentially extending safety hump between the bead seat of the wheel and the central annular area thereof such as the drop center.

Also an important object of the invention is to provide a tire changing machine of the characteristics mentioned above, wherein a single power source is operably coupled to a tire mount-demount tool driver as well as bead breaking mechanism but simultaneous operation of the tool driver and bread breaking mechanism is prevented by selective control mechanism which provides automatic function control without operator attention by virtue of the fact that during each operation of the power source, one or the other of the tool driver and bead breaking mechanisms are locked against operation while the other cycles.

In this connection a further important object of the invention is to provide a tire changing machine operated by single power source as described, wherein the bead breaking mechanism includes upper and lower bead breaking devices with the upper bead breaking device being removably mounted on the frame unit of the machine and selectively shiftable from a bead breaking location to a stowed position, whereby positioning of th upper bead breaker may be used to automatically effect selection of the mount-demount mode or bead breaking mode of operation without conscious effort on the part of the operator.

Another important object of the invention is to provide a tire changer having the features described above wherein the lower bead breaking device is pivotally mounted on the frame unit and has a guide bar on one face of the bead breaking shoe of the device in disposition such that during raising of the lower bead breaking shoe to effect displacement of a tire bead frm the bead seat therefor, the spacing bar contacts the rim flange of the vehicle wheel to assure movement of the shoe along a path where the inner tire engaging lip thereof is maintained in spaced relationship from the bead seat area of the wheel and a safety hump adjacent thereto, regardless of the diameter of the wheel positioned on the table support therefor of the tire changer.

A further important object of the invention is to provide novel upper bead breaking structure for the apparatus of a type wherein the bead breaker shoe is pivotally mounted on a support member adapted to be positioned by the service-man on a constraint in disposition with the bead breaker shoe proximal to the rim flange of the wheel thus providing automatic compensation for wheels of different diameter by virtue of the fact that the operator need not consciously determine the size of a particular wheel but is required only to place the upper bead breaker shoe in bead displacing disposition with respect to a tire on the wheel clamped to the frame unit of the machine.

A still further important object of the invention is to provide a tire changer having diametrically opposed bead breaking devices actuated by single power source and which are constructed and arranged so that the serviceman may provide for selective operation of either of the bead breakers alone or in combination as desired by the simple expedient of either moving the upper bead breaker unit to an inoperative location, or anternately, swing the lower bead breaking shoe out of its normal operating position to a location clearing the tire as the actuating linkage for the bead breakers is shifted by the power source during each cycle of operation thereof.

Other detailed objects and advantages of the present tire changer will be explained and become obvious as the following specification progresses.

BRIEF DESCRIPTION OF THE DRAWINGS

FIG. 1 is a plain view of tire changing apparatus constructed in accordance with preferred concepts of the present invention with the normal position of a wheel and tire mounted on the machine being shown in phantom, and dotted lines being used to show an alternate tire clearing position for the lower bead breaking shoe of the apparatus;

FIG. 2 is an end elevational view of the machine illustrated in FIG. 1 looking from the right hand side thereof and wherein certain parts are broken away to better reveal the construction, location and internal components of the machine;

FIG. 3 is a side view of the apparatus on essentially a vertical cross section basis and illustrating the mode of operation of the apparatus for dislodging both beads of a tire from a wheel on which such tire is mounted, with parts of the mechanism also being broken away to better illustrate the details of construction thereof and with a tire mount-demount tool of the type normally used on the rotatable center post of the machine being shown in phantom lines while the bead breaking shoes are illustrated as being in the positions thereof at the time of commencement of an operating cycle of the machine;

FIG. 5 is a side view of generally cross sectional nature as previously described and showing the relationship of the bead breaking devices during actuation thereof in the case where the lower bead breaker shoe encounters less resistance to movement than the upper bead breaking device and therefore moves through bead breaking displacement prior to shifting of the upper bead breaking assembly through a bead breaking increment of travel;

FIG. 9 is an enlarged fragmentary, generally schematic representation of the path of movement of the lower bead breaker shoe during shifting thereof to effect displacement of a tire bead from a wheel bead seat therefor and illustrating the function of the guide bar underlying the bead breaker shoe to maintain the tire engaging lip of the bead breaker out of contacting relationship with the bead seat area of a tire wheel including a safety hump adjacent thereto; and FIG. 10 is a fragmentary bottom view of the lower bead breaker shoe and the spacer bar guide thereon.

DESCRIPTION OF THE PREFERRED EMBODIMENT

Figure 8:
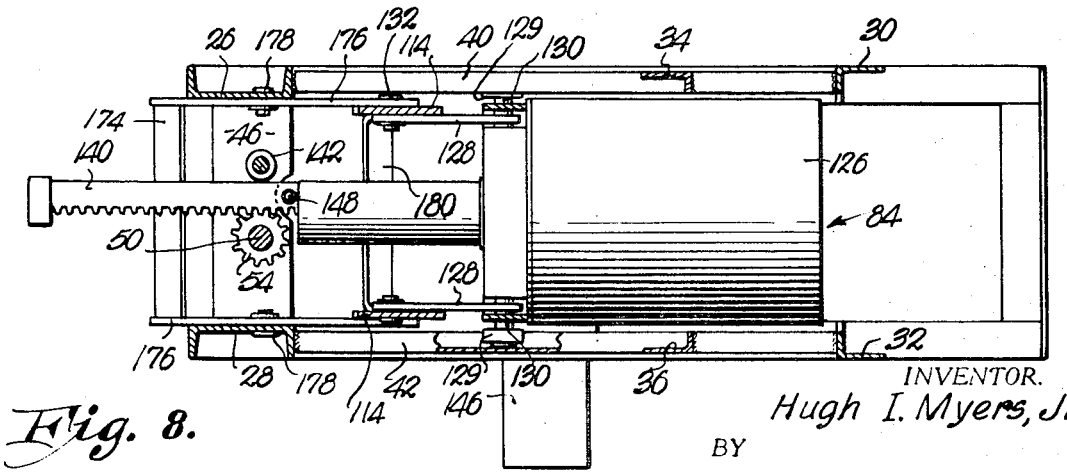
FIG. 8 is a horizontal cross sectional view taken substantially on the line 8—8 of FIG. 7 and looking downwardly in the direction of the arrows.

The tire changing machine broadly designated by the numeral 20 FIG. 3 in the drawings includes a frame unit 22 having a base assembly 24 provided with a pair of opposed, outwardly opening, upright channels 26 and 28 (FIGS. 3 and 8) attached thereto along with upright angles 30 and 32 at the opposite end of the base assembly which in cooperation with angles 34 and 36 parallel therewith and spaced inwardly from angles 30 and 32, serve as means for carrying a generally horizontal table 38. Upright angles 34 and 36 span the distance between table 38 and a pair of horizontal guides or braces 40 and 42 between channel 26 and angle 30, and channel 28 and angle 32, respectively. Table 38 includes a horizontal platform 38a which has depending side margins 36b connected to channels 26 and 28 as well as the angles 30 to 36 inclusive.

Two horizontal, vertically spaced cross bars 44 and 46 are connected between channels 26 and 28 above base assembly 24 and serve as means for supporting an upright sleeve 48 which extends between cross bar 44 and table 38 with the uppermost end of the sleeve projecting above the top of platform 38a as is best shown in FIGS. 3-6. A tool driving shaft or center post 50 is carried within sleeve 48 and extends abov the top thereof as indicated in FIG. 3 for selective receipt of a tire mount-demount tool 52. The uppermost end of the shaft 50 presents a key 50a for complemental fit within a slot in tool 52. A pinion 54 is keyed to shaft 50 for rotating the latter, with the pinion being located between cross bars 44 and 46.

Means for clamping a vehicle tire wheel 56 to table 38 in horizontal disposition thereon includes a removable, internally threaded, conically shaped clamp ring or nut 58 which is removably threaded over the upper extremity of sleeve 48. It is to be noted in FIGS. 3–6 that sleeve 48 is provided with partial thread defining tooth segments 48a.

In order to assure axial alignment of wheel 56 with shaft 50, a triangular support 60 is provided on table 38 to the right of shaft 50 in disposition such that the trapezoidal shaped, inclined, upwardly facing wall 60a is adapted to support a peripheral edge portion of one rim flange of wheel 56. Similarly, another triangular wheel support 62 is provided on table 38 to the left of channels 26 and 28 as viewed in FIG. 3. The inclined, outwardly facing wall 62a of support 62 merges into opposed triangular wings 64 (FIG. 1) each having inclined outer side edges 64a which receive and support a portion of the rim flange of wheel 56 thereon as depicted in FIGS. 1 and 3. In this manner, supports 60 and 62 cooperate to provide a firm foundation for wheels of various diameters.

Supports 60 and 62 are designed to receive and hold conventional metallic vehicular wheels 56 of the type having an inner annular bolt receiving hub 66 secured to and carrying an annular rim 68. The outer opposed circular rim flanges 70 and 72 merge with axially extending bead seats 74 and 76 respectively which in turn extend to the central annular drop center area 78. One or more radially extending safety humps 79 are provided between each bead seat and the drop center. Thus it can be seen from FIGS. 3 to 6 inclusive that the conical clamp 58 is adapted to be threaded over sleeve 48 until the downwardly facing arcuate surface of the clamp engages the hub portion 66 of wheel 56 to firmly secure the latter to table 38. For purposes of illustration, a conventional tubeless tire 80 is shown as being mounted on wheel 56 with the beads 81 and 83 thereof on bead seats 74 and 76 and against respective rim flanges 70 and 72. In order to remove tire 80 from wheel 56, it is necessary to displace beads 81 and 83 from the bead seats into drop center area 78. Thereafter, tool 52 may be used to force beads 81 and 83 of tire 80 off the rim flange 70 of wheel 56. Spring-biased anti-rotation pin 85 prevents rotation of wheel 56 during mounting and demounting of tire 80.

Frame unit 22 carries bead breaking mechanism broadly designated 82 (FIG. 3) which is operated by a single power source 84 carried by guides 40 and 42.

Bead breaking mechanism 82 is made up of a lower bead breaking device 86 permanently although pivotally mounted on frame unit 22, along with an upper bead breaking device 88 removably mounted on machine 20 and movable from the normal bead breaking position of the same as illustrated in drawings to the stowed disposition therefor as will be explained. Linkage for actuating bead breaking devices 86 and 88 during cyclic operation of power source 84 is broadly numerated 90. Lower bead breaking device 86 includes an elongated lever arm 92 made up of two horizontally spaced plates 92a and 92b (FIGS. 1, 3 and 10) separated by suitable spacers therebetween including an end cross-member 92c. Lever arm 92 is mounted on channels 26 and 28 for rotation about a cross pin 94 therebetween. A lower bead breaking shoe 96 is pivotally mounted on the outermost end of lever arm 92 through the medium of a pivot pin 98 (FIG. 10) carried by opposed plates 92a and 92b. Shoe 96 has a pair of outwardly projecting side sections 96a which support a curved plate 100 having an outer transversely arcuate tire engaging lip portion 100a. Spring 102 surrounding pivot shaft 98 has opposed legs engaging a suitable stop on lever arm 92 as well as shoe 96 to bias the latter in a clockwise direction viewing FIG. 3.

The relationship of bead breaker shoe 96 and support 62 is such that the lip portion 100a of shoe 100 properly attacks rim flange 72 of a wheel 56 clamped on table 38 regardless of the diameter of such wheel. A transversely circular, elongated guide bar 104 is secured to the underside of shoe 96 on the intermediate section thereof adjacent the main plane of the shoe and proximal to the innermost curved area of lip portion 100a. Guide bar 104 is thereby in a position to engage the rim flange 72 during displacement of bead 83 into the drop center area 78 of wheel 56.

Floating or whiffle tree type link or lever arm 106 is made up of a pair of spaced plates 106a and 106b (FIG. 4) joined by suitable cross-members including inclined cross structure 108 at the right hand end thereof viewing FIG. 3 for coupling link 106 to upper bead breaking device 88. Link 106 is pivotally coupled to lever arm 92 by a cross pin 110 therebetween. As is apparent from FIG. 5, depending wall section 112 of frame unit 22 serves as a stop for lever arm 92 to limit clockwise rotation thereof.

A pair of triangular plates 114 pivotally carried by pin 116 extending between sides 38b of table 38 cooperate to present an actuator 118. Connector links 120 pivotally join the uppermost left hand corners of actuator plates 114 to the lever arm or link 106. By virtue of the pivotal connection of links 120 to actuator 118 and lever arm or link 106 through the medium of pivot pins 122 and 124 respectively, lever arm or link 106 is free to swing about the axis of pivot pin 122 as well as rotate about pivot pin 124.

Power source 84 comprises a pneumatically actuated piston and cylinder assembly including a cylinder 126 having opposed slides 129 (FIG. 8) thereon which support the assembly for reciprocation along the length of channel shaped guides 40 and 42. A pair of connector links 128 supported by pins 130 (FIGS. 4–6) are pivotally joined to the lower extremities of actuator plates 114 by pin means 132. It is therefore clear that shifting of cylinder 126 longitudinally of braces 40 and 42 effects corresponding swinging movement of actuator 118 about the axis of pivot pin 116.

The piston 134 (FIG. 3) within cylinder 126 and normally biased to the right hand side thereof as illustrated in FIG. 3 by spring means 136, has a rod or driver 138 joined thereto which extends outwardly through the left hand end of cylinder 126 and is operably coupled to a rack 140 that extends between cross bars 44 and 46. Rack 140 is maintained in meshing relationship with pinion 54 by an upright guide roller 142 (FIG. 8) rotatably carried between cross bars 44 and 46.

A fluid control valve 144 (FIG. 3) carried by frame unit 22 is adapted to be actuated by a foot plate member 146 to permit selective direction of actuating fluid into cylinder 126. The actuating fluid is supplied to the cylinder 126 of power source 84 via inlet 147. Damping fluid such as oil within the interior of driver 138 is permitted to flow therefrom back and forth to reservoir 150 via line 148 as the piston 134 and cylinder 126 move relatively.

Upper bead breaking device 88 comprises an elongated, channel-shaped, downwardly opening support member 152 having a depending, longitudinally extending rack 154 mounted therewithin adjacent the right hand end of member 152 viewing FIG. 3 which is adapted to pivotally rest on an upright constraint 156 defining an upstanding rack engaging tooth. Constraint 156 is carried by a triangular shaped weldment 157 on the right hand portion of table 38 in spaced relationship from supports 60 and 62. It is particularly to be noted that the upper extremity of constraint tooth 156 is essentially at a level in horizontal alignment with bead seat 74 of a wheel 56 mounted on table 38 and in radially spaced outboard relationship to tire 80 carried by wheel 56. A second bead breaking shoe 158 of transversely curved configuration has a lower arcuate bead engaging lip portion 158a which is adapted to be place in proximal, generally conforming relationship to the rim flange 70 of wheel 56. Pivot pin 160 carried by the left hand end of support member 152 viewing FIG. 3 supports shoe 158 for swinging movement on a horizontal axis while coil spring 162 surrounding pin 160 and engaging stop 164 as well as the back side of the main plate portion of shoe 158, biases the latter in counterclockwise direction until the rearwardly extending legs 158b joined to the back side of shoe 158 contact the cross margin 152a of support member 152.

A connector rod 166 swingably mounted on support member 152 intermediate the ends thereof by pivot pin 168 has an L-shaped operator handle 170 on the upper extremity thereof which extends through the top wall of support member 152 so that an operator may readily grasp the handle and either properly position bead breaking device 88 in operative relationship to tire 80 on wheel 56, or move the device 88 to a stowed position thereof as will be explained. A coupling hook 172 carried by connector rod 166 at the lower-most extremity thereof is adapted to either engage underneath cross structure 108, or within one of the slots 108a defined between individual cross members 108b extending between the plates of lever arm 106.

MOvement of piston 134 and thereby rod 138 with its associated rack 140 to the left viewing FIG. 3 is normally blocked by a horizontal blocking dog 174 carried between parallel, horizontally spaced latch support elements 176 pivotal about respective pivot pins 178 (FIGS. 4 and 8) carried by channels 26 and 28 respectively. U-shaped latch member 180 has upright legs joined to the ends of elements 176 remote from dog 174 which is positioned to be received within aligned notches 182 in the lowermost extremites of plates 114 of actuator 118.

Figure 7:
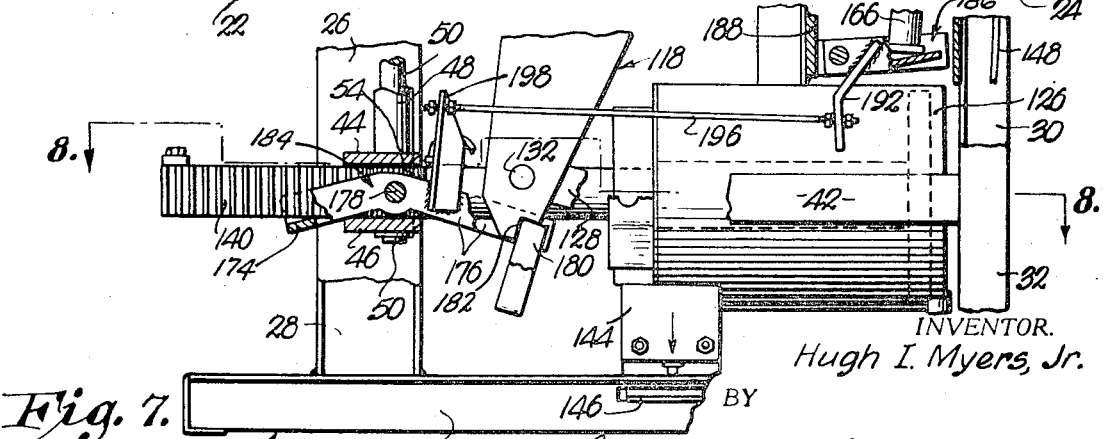
FIG. 7 is a fragmentary side view of the lower portion of the machine as illustrated in FIGS. 4, 5 and 6 and in this instance showing the positional relationship of the piston and cylinder blocking and latching mechanism controlling selective rotation of the center post or the bead breaking devices.

Means for swinging the combination blocking and latching structure 184 defined by dog 174 and member 180, includes a pan 186 (FIGS. 3, 4 and 7) pivotally mounted on cross member 188 suspended between angles 34 and 36 in disposition below upper bead breaking device 88, as best shown in FIGS. 3-6. The horizontal pad 190 of pan 186 is positioned to receive the lower extremity of rod 166 thereon when bead breaking device 88 is positioned in the stowed location thereof as illustrated in FIG. 7.

Extension 192 depending from one of the arms 194 of pan 186 supports a connector rod 196 which is in turn joined to an upright angle 198 welded to the proximal element 176 of structure 184. Clockwise swinging movement of pan 186 under the weight of bead breaking device 88 thereon occurs when the bead breaking device 88 is placed in its stowed position.

BEAD BREAKING OPERATION

Assuming first that the user of machine 20 desires to loosen both of the beads 81 and 83 of tire 80 from the bead seats 74 and 76 of wheel 56, the mounted tire is placed on table 38 as depicted in FIGS. 3-6 inclusive, with the rim flange 72 of rim 68 in contacting engagement with inclined support walls of triangular supports 60 and 62. The internally threaded clamp nut 58 is then placed over sleeve 48 and rotated until it is brought into tight engagement with the hub 66 of wheel 56 to firmly affix the wheel and tire to the frame unit 22. FIG. 3 illustrates dispositions of bead breaking devices 86 and 88. In readying bead breaking device 88 for most efficient displacement of bead 81 from the bead seat 74, the operator grasps handle 170 of the bead breaking device 88 and lifts upwardly on support member 152 to an extent to cause rack 154 to clear constraint tooth 156. The support member 152 is shifted toward tire 80 to bring the lower curved edge of shoe 158 into proximal relationship to the rim flange 70. The rack 154 is then brought back into complemental engagement with constraint tooth 156 with the rack tooth selected for this purpose being the one which assures closest spacing of shoe 158 to rim flange 70 of wheel 56 without overlapping the rim flange.

Note should be taken of the fact that coil spring 162 maintains shoe 158 in the position thereof illustrated in FIG. 3 whereby legs 158b of the shoe 158 contact the margin 152a on support member 152. Proper positioning of bead breaking device 88 and releasing the handle 170 as shown in FIG. 3 inherently causes the coupling hook 172 on the lower end of connector rod 166 to be located to engage cross structure 108. In the event coupling hook 172 is not located beneath the lowermost element of cross structure 108, because of the positioning of the bead breaking device 88 with respect to a particular width or diameter wheel, the coupling hook 172 is capable of moving into one of the slots 108a presented by cross members 108b.

Figure 4:
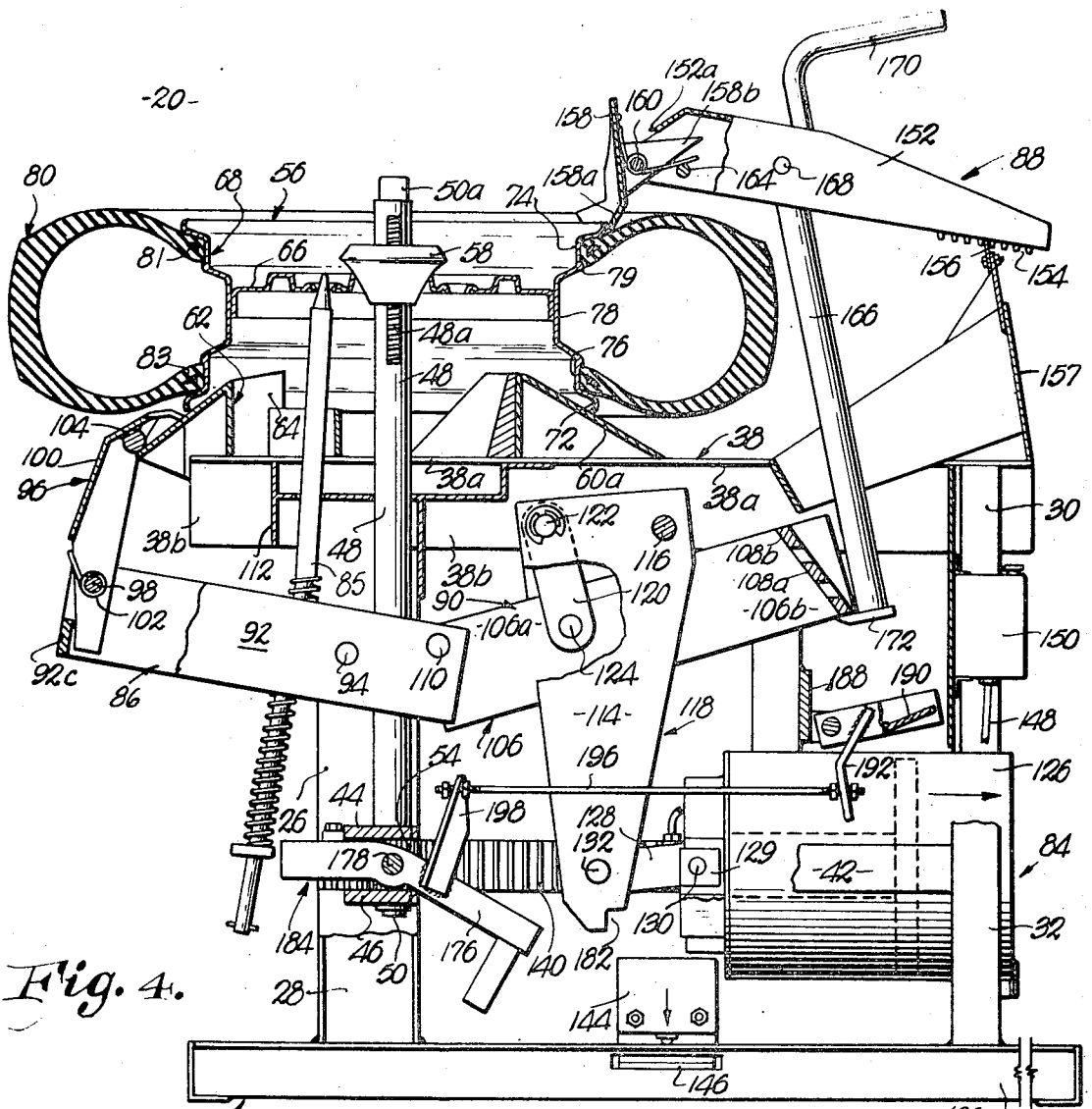
FIG. 4 is a side view similar to FIG. 3 but illustrating the relative relationship of the components of the bead breaking assembly after the linkage for shifting the bead breakers has been moved to a disposition where the bead breakers are just commencing to penetrate between the upper and lower wheel rim flanges respectively and corresponding beads of the tire.

The operator then steps on foot control plate 146 to operate valve 144 so that actuating fluid such as pressurized air is admitted to the interior of cylinder 126 via inlet 147 to thereby force the cylinder 126 to move to the right viewing FIG. 4. Movement of the cylinder 126 occurs by virtue of the fact that shifting of rod 138 and rack 140 is precluded from movement by blocking dog 174. The interior of driver tube 138 is filled with damping fluid such as oil which is returned to reservoir 150 in order to provide effective control over the speed of operation of the power source 84 by virtue of slow leakage of fluid past a fixed piston head within tube 138. As cylinder 126 moves to the right as indicated in FIG. 4, links 128 cause actuator 118 to be rotated about the axis of pivot pin 116 thereby causing lever arm structure 106 to be moved downwardly through the medium of connector links 120 and which has the effect of swinging lever arm 92 about the axis of cross pin 94. At the same time, a downward pulling force is exerted on rod 166 of bead breaking device 88 through the coupling of hook 172 with cross structure 108.

By virtue of the whiffle tree arrangement for operable connection of power source 84 to upper bead breaking devices 86 and 88 respectively, the bead breaking shoes 96 and 158 will move through the bead breaking displacements thereof in an order which is dependent upon the resistance offered to shifting of such shoes through their bead breaking paths of travel. However, in no event does the force applied to bead breaking devices 86 and 88 exceed predetermined values which are a function of the inherent force provided by power source 84 and the geometry of linkage 90 operably coupled to bead breaking devices 86 and 88.

Figure 6:
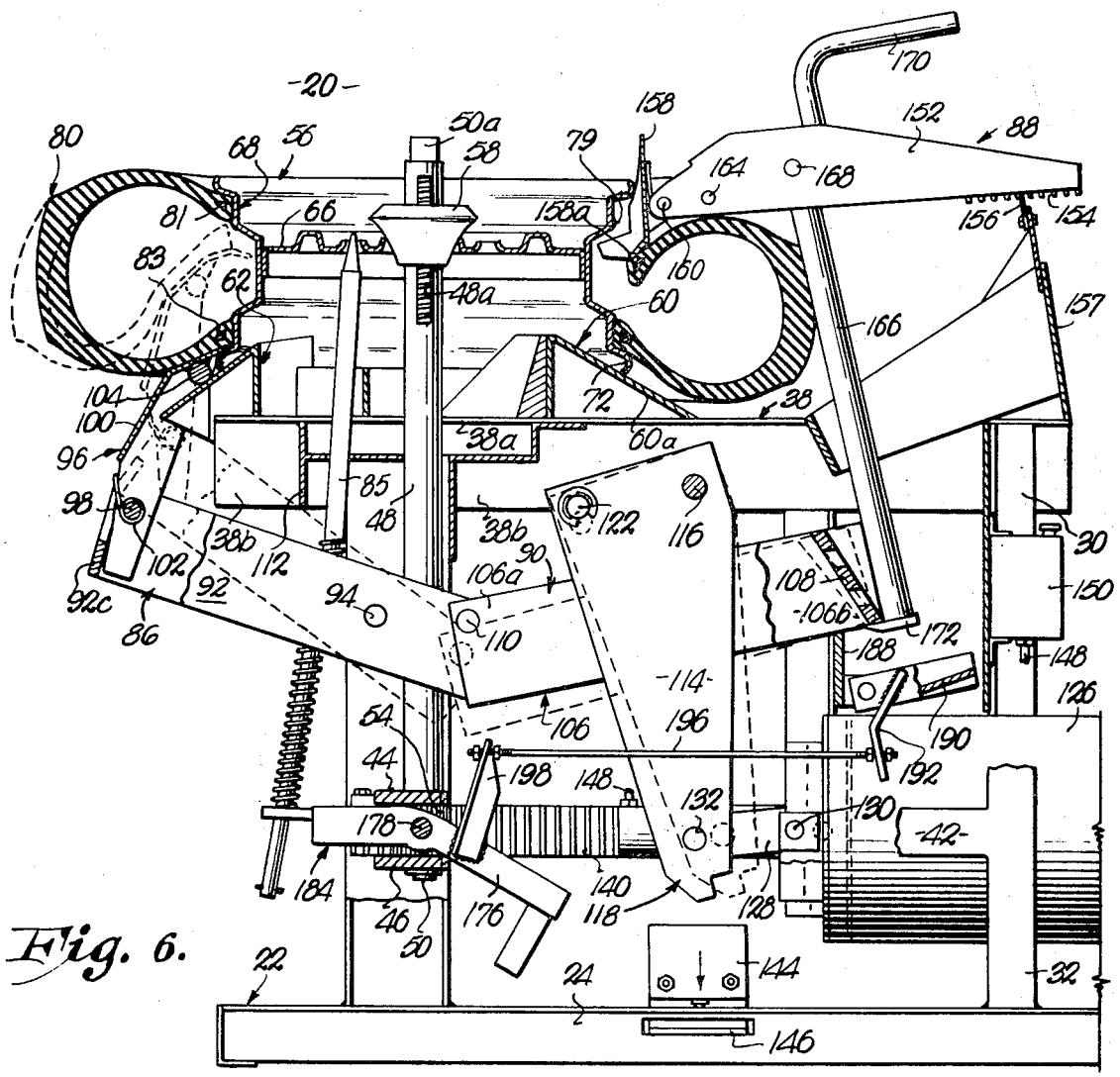
FIG. 6 is a side view of generally cross sectional nature similar to FIGS. 4 and 5 but in this instance illustrating a position of the upper bead breaker when the shoe thereon encounteres less resistance than the lower bead breaker whereby the upper bead breaker shoe displaces the tire bead from the bead seat therefor into the drop center of the tire wheel ahead of significant axial movement of the lower bead breaker shoe.

This sequence of bead breaking displacements is due to the fact that when lever arm or link 106 commences to move downwardly under the influence of actuator 118 being rotated in a counterclockwise direction viewing FIG. 4, lever arm 92 wants to rotate about the axis of pivot pin 94 in a clockwise direction at the same time that force is applied to rod 166 of bead breaking device 88 to shift bead breaking shoe 158 downwardly as support member 152 rotates about the fulcrum point therefor provided by rack 154. However, if the force at pivot 110 due to the resistance to displacement offered by lower bead 83 exceeds a proportional force in rod 166 due to the resistance offered by bead 81, then lever arm 106 rotates about the axis of pivot pin 110 to cause rod 166 to be pulled downwardly until lever arm 106 bottoms out against the upper edge of cross member 188 as illustrated in FIG. 6. As soon as the downward movement of the right hand end of lever arm 106 is interrupted by cross member 188, the fulcrum point provided thereby causes swinging of lever arm 106 about such fulcrum to rotate lever arm 92 about cross pin 94 thereby shifting bead breaking shoe 96 through its bead displacing path of travel to the position of the same shown in FIG. 5.

Alternately, assuming for purposes of this description that the force in rod 166 due to the resistance to displacement offered by upper bead 81 of tire 80 exceeds the proportional force at pivot 110 due to the displacement resistance of lower bead 83, then lever arm 106 will tend to swing in a counterclockwise direction about a fulcrum point generally defined by hook 172 whereby lever arm 92 is rotated clockwise to shift lower bead breaking shoe 96 through its bead breaking displacement as illustrated in FIG. 5. By virtue of the location of the pivot points for lever arm 92 as well as shoe 96, the latter tends to follow a path of travel which is best illustrated in FIG. 9. As the shoe 96 moves upwardly, the guide bar 104 thereon initially contacts the inclined surface of support 62 and then rides along such support as shoe 96 pivots relative to lever arm 92 about the axis of pivot pin 98. During such movement of shoe 96, it can be seen that the curved tire engaging upper edge thereof attacks rim 68 in substantially a radial direction with respect to wheel 56 and moves toward the bead seat area to assure penetration of the shoe between the tire and the rim before any significant axial movement of the shoe is effected. This arrangement assures penetration of the shoe between the rim flange and the tire bead before a displacing force is applied to the shoe thereby preventing roll-over of the tire bead without displacement of the bead as previously described. In addition, the lower bead breaking device 86 is adapted to provide automatic compensation for breaking loose beads of tires mounted on wheels 56 of various diameters without any change being required in the basic mechanism.

During continued upward movement of a bead breaking shoe 96, the guide bar 104 then contacts the rim flange 72 of rim 68 to thereby not only maintain the inner arcuate tire engaging edge of shoe 96 in spaced relationship from the rim 68 and particularly bead seats 76 thereof, bur also to subsequently cause movement of the shoe in a generally axial direction to assure displacement of the tire bead from bead seat 76. The location and size of guide bar 104 is also important to maintain the inner tire engaging edge of shoe 96 in sufficiently spaced relationship from bead seat 76 to assure clearance of hump 79 by the shoe 96. Lever arm 92 continues to rotate in a clockwise direction as shown in FIG. 5 until engagement of such lever arm with wall section 112 below table 38.

At that time, further movement of the cylinder 126 causes lever arm 106 to be pivoted about a fulcrum point defined by cross pin 110, thereby effecting a downward pulling motion on rod 166 and consequent swinging of support member 152 about the fulcrum point supplied by constraint 156. As the left hand end of support member 152 moves downwardly during counterclockwise swinging movement of the latter as shown in FIG. 5, the shoe 158 is rotated in a clockwise direction against the force of spring 162 and about the fulcrum point provided in inner engagement of the lower lip 158a of shoe 158 with the bead 81 of tire 80. As a consequence, the lip 158a penetrates between bead 81 and rim flange 70 in a generally radial direction prior to any substantial axial movement of the shoe lip 158a attributable to downward shifting of connector rod 166 under the influence of lever arm 106. When one or more of the legs 158b bottom out on associated stop means 164, further downward swinging movement of support member 152 causes the shoe 158 to move along a general axial path of travel with respect to rim 68 thereby effecting displacement of bead 81 from the bead seat 74 therefor. However, since shoe 158 is restrained against further rotation by stop means 164, the lip 158a of the shoe 158 remains in spaced relationship from bead seat 74 as well as a safety hump 79 associated therewith. The lever arm 106 will continue downward movement until it bottoms out on cross member 188.

TIRE MOUNT-DEMOUNT OPERATION

After breaking loose of beads 81 and 83 from respective bead seats therefor, the operator may remove tire 80 from wheel 56 using a tool 52 for that purpose. In carrying out this mode of operation on machine 20, it is initially presumed that piston 134 within cylinder 126 will have returned to its original standby position as shown in FIG. 3 under the influence of spring means 136 and as a result of release of air pressure from the cylinder by permitting the valve unit 144 to return to its exhaust position.

First, the serviceman grasps the handle 170 of bead breaking device 88, pulls upwardly on the assembly which disengages coupling tooth 172 from cross structure 108 and also disconnects support member 152 from constraint 156. The device 88 is then turned to rotate support member 152 through a 90 degree arc so that the bead breaking device 88 now extends transversely of table 38 rather than longitudinally thereof as illustrated in FIG. 3. The serviceman then lowers the bead breaking device 88 which causes connecting rod 166 to come to rest on pan 186 with the hook 172 engaging pad 190 to bias pan 186 in a clockwise direction viewing FIG. 3 to the position illustrated in FIG. 7. As a result, connector rod 196 is shifted to the left under the influence of extension 192 thereby swinging locking and latching structure 184 in a counterclockwise direction to bring latch member 180 into the position illustrated in FIG. 7 within respective notches 182 while blocking member 174 has been shifted out of blocking relationship to rack 140 and the piston 134 connected thereto.

As a consequence, the depression of foot control 146 operates the valve 144 to again admit air into the interior of cylinder 126. In this instance though, the cylinder 126 is locked against movement by engagement of latch member 180 with actuator 118 while rack 140 is free to reciprocate in response to movement of piston 134 and rod 138 joined thereto. As rack 140 moves to the left viewing (FIGS. 3 and 8), pinion 54 is rotated to rotate center post 50 therewith. By placing tool 52 over the key 50a of center post 50, prior to depressing the foot control 146, the operator may readily remove the beads 81 and 83 in successive order from the wheel rim 68. As those skilled in this art will readily appreciate, the end 52a of tool 52 is used to displace the tire from the wheel 56, whereas the end 52b is of construction for remounting a tire on the wheel rim 68 using center post 50 as a motive source of power for such demounting and mounting.

It can now be appreciated that center post 50 is rotated by power source 84 without consequent motion being imparted to bead breaking devices 86 and 88; and alternately, the bead breakers may be operated without resulting motion of the center post 50.

Another optional mode of operation of machine 20 is to pivot bead breaking shoe 96 against the bias of spring 102 in a counterclockwise direction as shown in FIG. 5 to the dotted line position thereof so that the bead breaker does not contact tire 80 for bead removal during swinging movement of lever arm 92. This feature permits an operator to use only the upper bead breaker to break loose beads from wide rim flange wheels such as those of the so-called mag type, by moving the lower bead breaker shoe 96 to its inoperative position whereby breaking loose of both beads in successive order can be accomplished by flipping the tire over between bead breaking operations. Similarly, if it is desired to break loose only the bottom bead of the tire, bead breaking device 88 may be removed from the machine 20 so that it is not operative during normal operation of the lower bead breaking device 82.

Having thus described the invention, what is claimed as new and desired to be secured by Letters Patent is:

1. In a tire changer for breaking loose both beads of a tire mounted on a wheel having an interior annulus and opposed rim flanges adjacent bead seats for receiving the respective tire beads, the improvement comprising: a frame unit receiving and holding the wheel, a pair of bead breaking devices; means for mounting one of the bead breaking devices on the frame unit for guided movement relative to said frame and to the wheel causing said one bead breaking device to first move into engagement with one bead of the tire for displacing said one bead from the associated rim bead seat toward the interior annulus of the rim; means for mounting the other bead breaking device on the frame unit for movement relative thereto and through a path unit causing said other bead breaking device to engage the other bead of the tire in offset opposed relation-ship relative to said one bead breaking device and to displace such other bead from the associated rim bead seat toward said interior annulus of the rim; a power source; and floating linkage means coupling the power source to each of said bead breaking device mounting means for moving said bead breaking devices through predetermined distances into engagement with the associated beads and then sequentially through the bead breaking paths of travel thereof, said floating linkage means including force dividing means operably intercoupling the power source and said mounting means for said bead breaking devices for maintaining a predetermined force ratio between each of the bead breaking devices during displacement of the beads from the bead seats regardless of varying magnitudes of resistance to displacement offered by respective beads, the first bead to break being effective to momentarily reduce said proportional forces applied to both beads thereby assuring that the bead breaking device associated with said first bead to break will fully terminate its movement before the other bead is released from its rim.

2. A tire changer as set forth in claim 1 wherein said bead breaking devices are positioned to engage diametrically opposed bead areas of the tire.

3. A tire changer as set forth in claim 1 wherein said power source comprises a single prime mover.

4. A tire changer as set forth in claim 1 wherein said floating linkage means coupling the power source to each of said bead breaking mounting means is operable to permit selective operation of the devices upon both movement of the non-selected device to an inoperative position and movement of one end portion of the non-selected mounting means through its full range of travel.

5. A tire changer as set forth in claim 1 wherein said floating linkage means includes a first lever arm pivotally carried by the frame unit and supporting said one bead breaking device for movement along the bead breaking path of travel thereof, means on the frame for limiting the pivotal movement of the first lever arm relative to the frame, a second lever arm movably connected to said first arm for shifting relative to the latter, means movably connecting the second arm to the frame unit for moving said first lever and said one bead breaking device along said bead breaking path thereof in response to movement of said second lever arm, means on the frame for limiting the movement of said second arm relative to said frame unit, means operably connecting said second lever arm to said other bead breaking device for moving said other bead breaking device along its bead breaking path of travel when the latter is in the bead breaking position on the frame unit, and means connecting said second lever arm to said power source for shifting said second lever arm upon actuation of said power source.

6. A tire changer for breaking loose both beads of a tire mounted on a wheel having an interior annulus and opposed rim flanges adjacent bead seats for respective tire beads, the improvement comprising: a frame unit for receiving and holding the wheel; a pair of bead breaking devices; means for mounting one of the bead breaking devices on the frame unit for guided movement relative thereto causing said one bead breaking device to first move into engagement with one bead of the tire for displacing said one bead from the associated rim bead seat toward the interior annulus of the rim; means for mounting the other bead breaking device on the frame unit for movement relative thereto and through a path causing said other bead breaking device to engage the other bead of the tire in offset opposed relationship relative to said one bead breaking device and to displace such other bead from the associated rim bead seat toward said interior annulus of the rim; a power source; and mechanism coupling the power source to each of said bead breaking devices for moving the latter through the bead breaking paths of travel thereof, said mechanism including means operably intercoupling the power source and said bead breaking devices for maintaining predetermined force ratios between the power source force and the force applied by each of the bead breaking devices to the tire beads in directions to effect displacement thereof from the bead seats therefor, regardless of the resistance to displacement offered by respective beads; said mechanism including a first lever arm pivoted on the frame unit and supporting said one bead breaking device for movement along the bead breaking path of travel thereof, a second lever arm pivoted to said first arm for shifting the latter, means movably mounting the second arm on the frame unit in disposition to effect movement of said one bead breaking device along said bead breaking path thereof in response to movement of said second lever arm, means operable by the second lever arm during movement thereof for moving said other bead breaking device along the bead breaking path of travel of the same when the latter is in the bead breaking disposition thereof on the frame unit, and means operated by said power source for shifting said second lever arm; said means movably mounting the second lever arm of the frame unit including a link pivotally supported by the frame unit for swinging movement about an axis parallel to and spaced from the axis of pivoting of the first lever arm and the axis of pivotal connection of the second lever arm to the first lever arm, and means pivotally mounting the second lever arm on said link for pivotal support thereby and spaced relationship from the axis of pivoting movement of the link.

7. A tire changer as set forth in claim 6 wherein said second lever arm is pivotally coupled at one end thereof to said first lever arm, the means for coupling the second lever arm to said other bead breaking device is located at the opposite end of the second lever arm, and the point of pivotal connection of the link to said second lever arm is intermediate the points of operable coupling of the second lever arm to said first lever arm and said second lever arm to said other bead breaking device respectively.

8. A tire changer as set forth in claim 6, wherein said link is pivotally carried by an actuator pivotally mounted on the frame unit for swinging movement about an axis parallel to and spaced from the axis of pivoting of the link relative to the actuator, and means for operably coupling the actuator to the power source for swinging the actuator in response to operation of the power source.

9. A tire changer as set forth in claim 8 wherein said power source includes a power assembly having a shiftable element selectively movable upon actuation of the assembly, said element being operable during movement thereof to swing the actuator and thereby shift the second lever arm to move the bead breaking devices through respective bead breaking paths of travel thereof.

10. A tire changer for breaking loose both beads of a tire mounted on a wheel having an interior annulus and opposed rim flanges adjacent bead seats for respective tire beads, the improvement comprising: a frame unit for receiving and holding the wheel; a pair of bead breaking devices; means for mounting one of the bead breaking devices on the frame unit for guided movement relative thereto causing said one bead breaking device to first move into engagement with one bead of the tire for displacing said one bead from the associated rim bead seat toward the interior annulus of the rim; means for mounting the other bead breaking device on the frame unit for movement relative thereto and through a path causing said other bead breaking device to engage the other bead of the tire in offset opposed relationship relative to said one bead breaking device and to displace such other bead from the associated rim bead seat toward said interior annulus of the rim; a power source; and mechanism coupling the power source to each of said bead breaking devices for moving the latter through the bead breaking paths of travel thereof, said mechanism including means operably intercoupling the power source and said bead breaking devices for maintaining predetermined force ratios between the power source force and the force applied by each of the bead breaking devices to the tire beads in directions to effect displacement thereof from the bead seats therefor, regardless of the resistance to displacement offered by respective beads; said mechanism including a first lever arm carried by the frame unit and supporting said one bead breaking device for movement along the bead breaking path of travel thereof, a second lever arm operably coupled to said first arm for shifting the latter, means movably mounting the second arm on the frame unit in disposition to effect movement of said one bead breaking device along said bead breaking path thereof in response to movement of said second lever arm, means operable by the second lever arm during movement thereof for moving said other bead breaking device along the bead breaking path of travel of the same when the latter is in the bead breaking disposition thereof on the frame unit, and means operated by said power source for shifting said second lever arm; the means mounting said other bead breaking device on the frame unit includes a constraint in spaced relationship from a tire carried by the frame unit, an elongated support member adapted to be supported on the constraint, said other bead breaking device being mounted on the end of the support member normally located in proximal relationship to the tire, and a component secured to the support for movement therewith, their being means on said second lever arm and the component for moving the latter in a direction to shift the support member through a displacement to move said other bead breaking device through the bead breaking path of travel thereof.

11. A tire changer as set forth in claim 10 wherein said other bead breaking device is pivotally mounted on the support member, there being means on the support member engageable with said other bead breaking device for limiting the extent of swinging thereof in a direction toward the wheel rim when the support member is positioned on the constraint, with said other bead breaking device against the tire adjacent the wheel rim during the first part of movement of said other bead breaking device through the bead breaking path of travel thereof.

12. A tire changer as set forth in claim 10 wherein is provided selectively interengageable teeth means on the support member and said constraint for facilitating selective positioning of the support member on the constraint to permit variation of the effective length of the support member rela-tive to the constraint.

13. A tire changer as set forth in claim 1 wherein said frame unit is provided with an essentially horizontally disposed wheel mounting table adapted to support the tire and wheel in generally horizontal disposition, said one bead break-ing device being located below a tire on the table to displace the lower tire bead toward the central annulus of the rim, and the other bead breaking device is positionable over the tire for displacing the upper tire bead toward the central annulus of the wheel.

14. A tire changer as set forth in claim 1 wherein is provided means operably associated with said bead breaking devices for causing the latter to primarily first shift radially of respective rims between corresponding rim flanges and the tire beads and thence along more axial paths of travel with respect to the wheel to effect displacement of opposed tire beads from the bead seats therefor.

15. A tire changer as set forth in claim 1 wherein said one bead breaking device is selectively movable to a position clearing the tire during operation of the power source through its full bead breaking stroke.

16. A bead breaker assembly for a vehicular tire mounted on a wheel having a rim flange, an annular interior area, and a bead seat between the flange and said interior area, said bead breaker assembly comprising:
- a frame unit for receiving and holding the wheel rim in a fixed position;
- a bead breaking shoe with a leading lip and structure carried outboard of the wheel rim supporting the shoe in disposition to engage the tire bead adjacent said rim flange;
- means coupled to said shoe and cooperable with said structure to primarily first shift the shoe lip radially of the wheel rim between the rim flange and the tire bead and to thereafter move the shoe lip generally axially of the wheel rim about a point radially outboard of the rim and generally in the plane of the bead seat in a direction to displace the bead from the bead seat toward said interior area of the wheel while the lip of the shoe remains in spaced relationship from said bead seat.

17. An assembly as set forth in claim 16 wherein said structure includes an elongated support member carrying the shoe thereon and a constraint outboard of the wheel rim and pivotally supporting said support member for rotation relative thereto.

18. An assembly as set forth in claim 17 wherein said support member and the constraint include means for varying the effective length of the support member to permit selective positioning of the shoe with respect to the tire bead seat area regardless of the effective diameter of the wheel.

19. An assembly as set forth in claim 18 wherein is provided means pivotally mounting the shoe on the support member for rotation about an axis in parallel relationship to the axis of pivoting movement of the support member about said constraint.

20. An assembly as set forth in claim 17 wherein said support member is provided with stop means thereon positioned to be engaged by the shoe during pivoting thereof to limit the motion of the shoe lip toward the bead seat area as the support member pivots relative to the constraint to first produce limited inward radial lip motion followed by generally axial motion thereof during displacement of said bead from the bead seat toward the interior area of the wheel.

21. A bead breaker assembly for breaking loose one bead of a vehicular tire mounted on a wheel having a rim flange and a bead seat for said one bead leading to a central annular area, said bead breaker assembly comprising:
- a frame unit for receiving and holding the wheel rim in a fixed position with said one bead of the tire exposed for displacement thereof toward said annular central area thereof;
- a bead breaking shoe and;
- structure radially outboard of the wheel rim bead seat area supporting the shoe for pivoting movement about first and second spaced parallel axes respectively, said structure being operable to first primarily shift the shoe lip radially of the wheel rim between the rim flange and said one tire bead as the shoe pivots about both of said axes of pivoting movement and to thereafter move the shoe primarily axially of the wheel rim in a direction to displace said one bead from the bead seat into the annular central area of the wheel as the shoe pivots about the second of said axis of pivoting movement, said second axis of pivoting movement being located in sufficient space outboard relationship from the mounted wheel rim in essentially the plane of the bead seat and in disposition to cause the shoe lip to move along the bead seat in essentially constant spaced relationship therefrom.

22. An assembly as set forth in claim 21 wherein said structure includes an elongated support member pivotally carrying the shoe thereon, said structure further including a plurality of selectively engageable pivot means in radial spaced relationship from a tire mounted on said frame unit and on said elongated support to permit rotation of said support member relative to the frame unit and to permit variation of the effective length of the support member and thereby the spacing of said shoe lip from the pivot on said frame unit so that wheels of different diameter may be accommodated on the frame unit.

23. An assembly as set forth in claim 22 wherein said support member is provided with stop means thereon located to be engaged by the shoe to limit further rotation thereof with respect to the support member after the shoe has penetrated between the rim flange and the bead seat to cause further movement of the shoe lip to be restricted to generally an axial path relative to the bead seat of the wheel.

24. An assembly as set forth in claim 23 wherein is provided spring means on the support member engaging the shoe for biasing the latter away from said stop means therefor.

25. A power operated tire changer comprising:
a frame for receiving and holding a tire wheel;
tire bead loosening means carried by the frame for break-ing loose at least one bead of a tire mounted on a wheel;
tire mount-demount means on the frame;
a single power source;
means for operably coupling the power source to said bead loosening means for effecting bead breaking operation thereof;
means for operably coupling the power source to said tire mount-demount means; and
selecting means operably associated with said power source for preventing bead loosening means movement in one mode thereof thereby allowing operation of the tire mount-demount means, and alternately operable in another mode to prevent operation of the tire mount-demount means while allowing bead breaking movement of the bead loosening means.

36. A tire changer as set forth in claim 25 wherein said power source comprises two elements each mounted for movement with respect to said frame and with respect to each other; said first element being operably associated with said tire mount-demount means to shift the latter upon actuation of the power source when the second element is fixed with respect to the frame and said second element being operably associated with said bead loosening means for shifting the latter upon actuation of the power source when said first element is fixed relative to the frame, there being means for permitting movement of a selected element only with respect to the frame.

27. A tire changer as set forth in claim 25 wherein said power source comprises a fluid actuated assembly having piston and cylinder units selectively movable relatively and relative to the frame, said bead loosening coupling means being operable by one of the units upon movement thereof relative to the frame and the tire mount-demount coupling means being operable by the other unit upon movement of the latter with respect to the frame, there being means associated with said fluid actuated assembly for permitting movement of a selected unit only with respect to the frame.

28. A tire changer as set forth in claim 25 wherein said means for operably coupling said power source to said bead loosening means includes a movable actuator carried by said frame unit, said actuator being operably coupled to the bead loosening means for moving the latter during operation of the power source, said power source including a driver movable upon actuation of the power source to operate said mount-demount means; and said selecting means includes a movable locking dog normally disposed in blocking relationship to the driver and shiftable to a location clearing the latter permitting operation of the tire mount-demount means by the driver, there being latch means operably associated with the locking dog for preventing motion of the actuator when the locking dog is moved out of blocking relationship with the driver and conversely for allowing motion of the actuator when the locking dog is in blocking relationship with the driver.

29. A tire changer as set forth in claim 28 wherein said tire mount-demount means includes a rotatable element, said driver including a rack movable therewith, and gear means on the element in operable mesh with the rack for effecting rotation of the element in response to reciprocation of the rack.

30. A tire changer as set forth in claim 28 wherein said power source comprises a fluid actuated assembly having piston and cylinder units, one of the units being joined to the driver for operating the latter and the other unit being mounted for movement relative to said one unit upon blocking of the driver by said locking dog thereby causing operation of said actuator, said actuator being operably coupled to said other unit to restrain movement thereof when the actuator is locked against movement by the latch means thereby causing shifting of the driver.

31. A tire changer as set forth in claim 30 wherein is provided means for moving the locking dog into blocking relationship to the driver and the latch means out of latching engagement to the acutator when the bead loosening means is in bead breaking disposition thereof.

32. A tire changer as set forth in claim 28 wherein is provided means for moving the locking dog into blocking relationship to the driver and the latch means out of latching engagement to the actuator when the bead loosening means is in bead breaking disposition thereof.

33. A tire changer as set forth in claim 28 wherein is provided means for moving the locking dog out of blocking relationship to the driver and the latch means into latching engagement to the actuator when the tire mount-demount means is in mounting or demounting disposition thereof.

34. A tire changer as set forth in claim 25 wherein means is provided to place said selecting means into operable position for preventing operation of said mount-demount means while allowing bead breaking movement of said bead breaking means when the bead loosening means is in bead breaking disposition thereof.

35. A tire changer as set forth in claim 25 wherein means is provided to place said selecting means into operable position for preventing operation of said bead loosening means while allowing operation of said mount-demount means when the tire mount-demount means is in mounting and demounting disposition thereof.

36. A tire changer as set forth in claim 28 wherein said bead loosening means includes a bead breaking shoe, a support member, and means mounting the shoe on the support member in disposition to engage the bead of a tire on said wheel, said support member being provided with means positioned to be operated by said actuator for shifting the support member and thereby the bead breaking shoe to displace the tire bead from the wheel bead seat therefor, there being means joining the locking dog and the latch means for movement thereof into alternate positions of the same, and means positioned to be operated by the bead loosening means when the latter is removed from bead breaking disposition and placed in a stowed position on the frame unit for effecting shifting of the locking dog unit out of locking relationship to the driver as the latch means is moved into disposition to be engaged by the actuator.

37. A tire changer as set forth in claim 36 wherein said means for shifting the locking dog and latch means includes a pad swingably mounted on the frame unit in disposition to receive the bead loosening means thereon when the bead loosening means is in said stowed position thereof, there being connecting means operably joining the pad to the locking dog and latch means to swing the latter in response to pivoting of the pad by the bead loosening means.

38. A tire changer as set forth in claim 37 wherein said bead loosening means also includes a rod depending from said support member operably connecting said support member and said actuator for swinging the support member and thereby the bead breaking shoe to displace the tire bead from the wheel bead seat upon operation of the actuator, said rod also being selectively positionable when the bead loosening means is removed from the bead breaking disposition and placed in a stowed position to effect shifting of the locking dog out of locking relationship to the driver as the latch means is moved into latching engagement by the actuator.

39. In a tire changer for breaking loose both beads of a tire mounted on a wheel having an axis of generation and bead seats for respective tire beads, the improvement comprising: a frame unit for receiving and holding the wheel; lower and upper bead breaking devices disposed at different radial positions relative to the axis of the wheel and each being provided with a bead engaging shoe; means mounting the devices on the frame unit for movement of the shoe of said lower device into engagement with the tire bead in closest proximity to the frame and movement of the shoe of the upper device into engagement with the other bead of a tire on a wheel while the latter is supported on the frame unit; and means for operating both the bead breaking devices, the bead breaking shoe of said lower device being mounted for shifting movement from a normal bead engaging position to a tire clearing location so that only the shoe of the upper device engages the tire during operation of the devices.

40. A bead breaker assembly for a vehicular tire mounted on a wheel having a rim flange, an annular interior area, a bead seat adjacent the flange, and a safety hump between the bead seat and said interior area, said bead breaker assembly comprising:
a frame unit;
a wheel support table on the frame unit;
means operably associated with the frame unit for holding a wheel in a fixed position thereon;
a bead breaking shoe;
means mounting the shoe on the frame unit for movement along a path to engage the bead of the tire on said bead seat therefor and to displace such bead from the seat past said safety hump into the interior area of the wheel;
said shoe mounting means including means operable to first urge the shoe primarily radially inwardly toward the wheel and then axially of said rim during movement of the shoe along the bead displaying path thereof.
means operably joined to the shoe mounting means for moving the shoe along said bead breaking path of the same; and
guide means on the shoe located to engage the rim flange of the wheel after the shoe has penetrated past the rim flange to the bead seat area and operable thereafter to prevent further inward radial motion of the shoe toward the bead seat until after the bead engaging part of the shoe has moved axially past the safety hump into the interior area of the wheel.

41. An assembly as set forth in claim 40 wherein said guide means comprises an appendage attached to the face of the shoe proximal to the support table.

42. An assembly as set forth in claim 41 wherein said appendage comprises an elongated bar located with the longitudinal axis thereof parallel with the shoe and extending transversely of the path of travel of the shoe.

43. A power operated tire changer comprising: a frame for receiving and holding a tire wheel; tire bead loosening means carried by the frame for breaking loose at least one bead of a tire mounted on a wheel; tire mount-demount means on the frame; a single power source; first means for operably coupling the power source to said bead loosening means for effecting bead breaking operation thereof; second means for operably coupling the power source to said tire mount-demount means; and selectively operable control means associated with said power source and said first and second coupling means, said control means being effective for precluding operation of said bead breaking means and for permitting operation of said mount-demount means when in a mount-demount position, and being effective to permit operation of said bead breaking means when in a bead breaking position.

44. In a tire changer for breaking both beads of a tire mounted on a wheel having an axis of generation and bead seats for respective tire beads, the improvement comprising: a frame unit for receiving and holding the wheel; lower and upper bead breaking devices disposed at different radial positions relative to the axis of the wheel and each being provided with a bead engaging shoe; floating linkage means mounting the devices on the frame unit for movement of the shoe of said lower device into engagement with the tire bead in closest proximity to the frame and movement of the shoe of the upper device into engagement with the other bead of a tire on the wheel while the latter is supported by the frame unit; a single power source connected to said floating linkage means, said floating linkage means being responsive upon actuation of said power source for first moving said bead breaking device into engagement with the associated beads and then sequentially through their bead breaking strokes, said floating linkage means acting as a force divider for dividing the input force from said power unit into two proportional bead breaking forces with one of the forces pressing upward on one bead and the other force pressing downward on the other bead until one of the beads breaks from its bead seat and the associated bead breaking device moves through its full stroke, and stop means on said frame for terminating the movement of the bead breaking device first to move through its full stroke for receiving the proportional force directed to said associated bead breaker thereby applying a proportional force of increasing magnitude to the other bead breaker until the other bead breaks from its bead seat.

45. A machine for sequentially breaking both beads of a tire from a wheel rim comprising; a frame including a wheel support, means for securing a wheel and tire to said wheel support, a first lever pivoted to said frame, a first bead breaking shoe operatively connected to one end of said lever and responsive to pivotal movement of said lever through a bead breaking stroke for breaking one bead from the rim, a second lever rotatable and translatable relative to said frame and operatively connected to said first lever, a second bead breaking shoe diametrically opposed to said first shoe and operatively connected to said second lever, said second bead breaking shoe being responsive to break the other bead from the wheel rim upon movement of said second lever through its bead breaking stroke, single power means operatively connected to said second lever for moving said levers through their bead breaking strokes, and stop means for limiting the arcuated movement of each lever upon completion of movement of the associated shoe through its bead breaking stroke, said power means being arranged to apply a predetermined proportion of the total force being exerted by said power means to each lever for urging both shoes against their respective beads with sufficient force to cause one shoe to first break the easiest to break bead from the rim and to terminate its movement prior to exerting a force against the other shoe sufficient to break the other bead from the rim.

46. A machine for sequentially breaking both beads of a tire from a wheel rim comprising, a frame including a wheel support, means for securing a wheel and tire to said support, a first bead breaking shoe, a second bead breaking shoe radially spaced from said first shoe, a power source, and power actuated articulating force transmitting linkage means pivotally connected to said frame at a pivot point and operatively connected to both of said shoes and to said power source for limited arcuate movement through a bead breaking stroke, said articulating linkage means being arranged to apply a proportional bead breaking force to each shoe for urging both shoes against their bead with sufficient force to cause one shoe to first break only the easiest to break bead from the rim and to terminate its movement prior to exerting a force against the other shoe sufficient to break the other bead from the rim.

47. A machine for sequentially breaking both beads of a tire from a wheel rim comprising, a frame including a wheel support, means for securing a wheel and tire to said support, a first bead breaking shoe, a second bead breaking shoe, a power source, articulated force transmitting means defined by at least a pair of pivotally interconnected levers, one of said bead breaking shoes being operatively connected to one lever and movable into position to engage one bead and the other shoe being operatively connected to another lever and movable into position to engage the other bead at a point radially spaced from said first shoe, means pivotally connecting only one of said pair of levers to said frame, stop means for limiting the pivotal movement of each lever, and means operatively connecting said power means to another of said levers so that actuation of said power means will apply a proportional bead breaking force to each lever for urging both shoes against their beads with sufficient force to cause only one shoe to first break the easiest to break bead from the rim, said stop means being arranged to there-after terminate movement of said one shoe prior to initiation of the bead breaking movement of the other shoe thereby causing the application of a sufficient force against the other shoe to then break the other bead from the rim.

* * * * *

UNITED STATES PATENT OFFICE
CERTIFICATE OF CORRECTION

Patent No. 3,742,999      Dated July 14, 1971

Inventor(s) HUGH I. MYERS, JR.

It is certified that error appears in the above-identified patent and that said Letters Patent are hereby corrected as shown below:

Column 5, line 39, change "mountdemount" to --mount-demount--

Column 6, line 53, change "bread" to --bead--

Column 6, line 68, change "th" to --the--

Column 7, line 10, change "frm" to --from--

Column 7, line 38, change "anternately" to --alternately--

Column 8, line 25, change "encounteres" to --encounters--

Column 9, line 1, change "36b" to --38b--

Column 9, line 10, change "abov" to --above--

Column 11, line 59, change "MOvement" to --Movement--

Column 13, line 12, after "of" insert --upper--

Column 13, line 15, after "to" delete --upper--

Column 14, line 20, change "bur" to --but--

Column 16, line 16, change "relation-ship" to --relationship--

Column 19, line 22, change "rela-tive" to --relative--

Column 19, line 27, change "break-ing" to --breaking--

Column 21, line 11, change "break-ing" to --breaking--

Column 26, line 28, change "there-after" to --thereafter--

Signed and sealed this 17th day of June 1975.

(SEAL)
Attest:

RUTH C. MASON
Attesting Officer

C. MARSHALL DANN
Commissioner of Patents
and Trademarks